(No Model.)
B. F. BROUGH.
COMPUTING SCALE.
No. 575,143.  Patented Jan. 12, 1897.
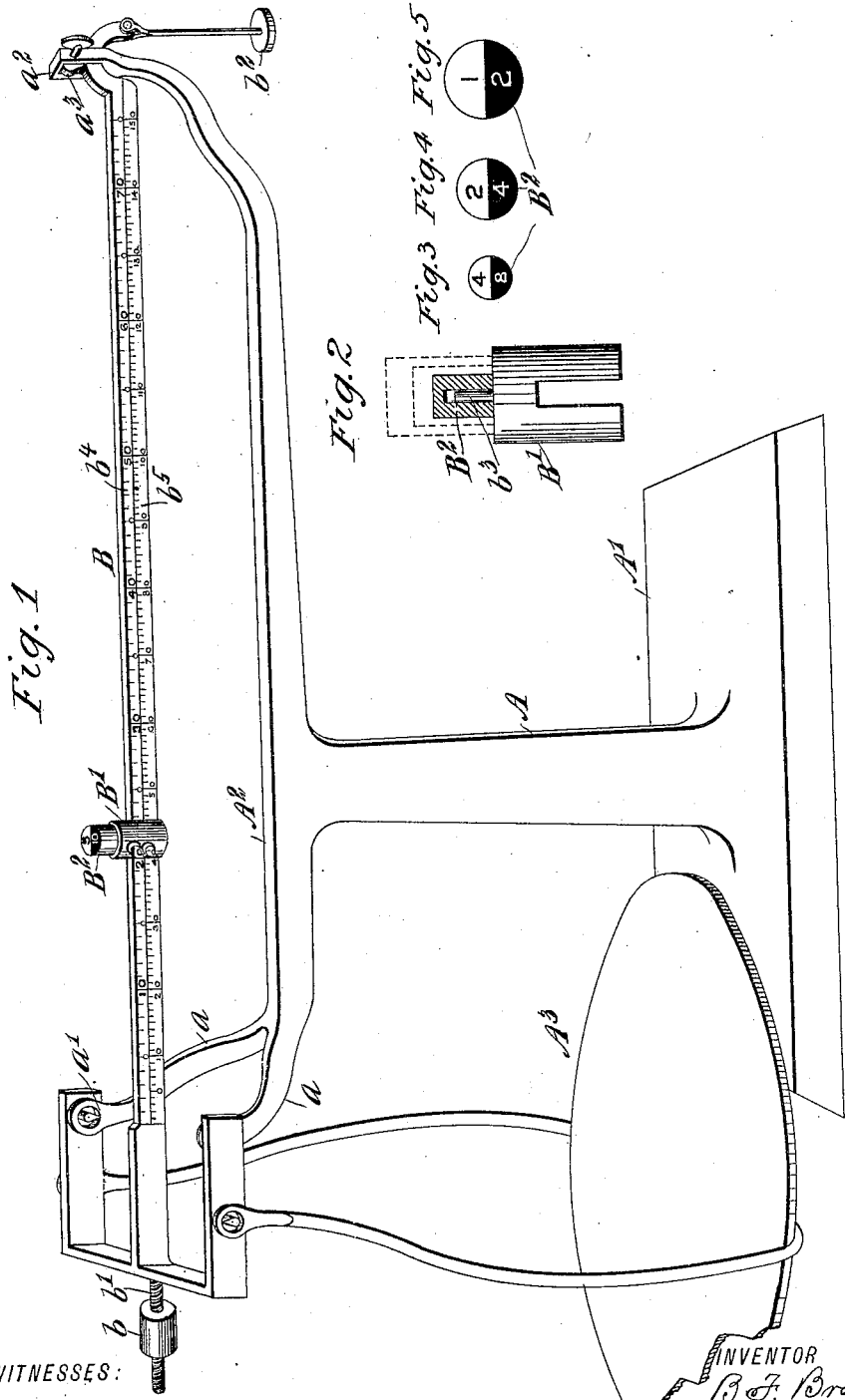

UNITED STATES PATENT OFFICE.

BENJAMIN F. BROUGH, OF INDIANAPOLIS, INDIANA.

COMPUTING-SCALE.

SPECIFICATION forming part of Letters Patent No. 575,143, dated January 12, 1897.

Application filed October 31, 1895. Serial No. 567,464. (No model.)

*To all whom it may concern:*

Be it known that I, BENJAMIN F. BROUGH, of Indianapolis, in the county of Marion and State of Indiana, have invented new and useful Improvements in Computing-Scales, of which the following is a full, clear, and exact description.

This invention relates to combined weighing and price-computing scales; and the object is to provide a device whereby the value of an article may be quickly and accurately ascertained by the cost-marks on the scale-beam.

I will describe a scale embodying my invention, and then point out the novel features in the appended claims.

Reference is to be had to the accompanying drawings, forming a part of this specification, in which similar characters of reference indicate corresponding parts in all the views.

Figure 1 is a perspective view of a scale embodying my invention. Fig. 2 is an elevation of a poise employed and showing a weight in section thereon; and Figs. 3, 4, and 5 are plan views of weights employed.

The scale comprises a standard A, extended from a base A' and supporting an arm $A^2$. At one end the arm $A^2$ has portions $a$ extended upward, providing fulcrum-bearings $a'$ for the beam B. The free end of the beam B extends through a yoke $a^2$ at the end of the arm $A^2$, and in which is pivoted the usual locking-latch $a^3$. The beam may be adjusted into balance by means of a weight $b$, movable on a screw-stem $b'$, extended from the rear end of the beam and rearward of its fulcrum, and, further, by means of the ordinary shot-box $b^2$, suspended from the forward or free end of the beam.

A scale-pan $A^3$ is suspended from the scale-beam rearward of its fulcrum, and a pea B' is adapted to slide on the beam. A pin $b^3$ extends upward from the pea B' and is designed to enter a recess in a weight $B^2$, whereby the weight is prevented from sliding off.

The beam B is divided horizontally into two sets of cost indices or graduations, the upper set $b^4$ indicating one-half the amount indicated by the lower set $b^5$. It is obvious that there may be a greater number of lines of indices, but the two here shown will fully illustrate my invention.

The upper face of the weight $B^2$ is marked with two numbers, the lower number being double the higher number, and for the purpose of easily and quickly recognizing the lesser from the greater number one number, preferably, is shown in dark color on a light background and the other number is shown in light color on a dark background. Each cost-division on the beam is divided into ten subdivisions, each subdivision indicating one cent's worth of goods at any price.

In the operation of my invention, and assuming that the price of the article sold is five cents per pound, the article will be placed on the scale-pan and the weight bearing the numeral "5" will be placed on the pea, and then the pea will be slid along the beam until a balance is obtained, and then the number pointed out on the upper set $b^4$ of indices will represent the cost of the article, for instance, twenty cents, as indicated in Fig. 1. If the price of the article be ten cents per pound, the cost must be taken from the lower set $b^5$ of indices, which in Fig. 1 indicates forty cents.

It will be seen that a scale embodying my invention is particularly valuable in selling meats, butter, or like commodity that cannot be cut accurately to the pound; that is, should a purchaser desire approximately one pound of steak the piece cut may weigh slightly less or slightly more than one pound, and therefore, assuming the price to be ten cents per pound, the pea, with the proper weight thereon, will be slid to a balance on the beam, and if this balancing-point should be on the subdivision "8" of the lower set of indices the cost is ascertained as eight cents, and of course if the balancing-point is on the subdivision "12" the cost of the meat will be twelve cents, as the weight is greater than one pound.

It will be observed that the zero-mark on the scale-beam is in line with the fulcrum-bearings of the beam. This is essential. Otherwise when the weights are changed the scale would be out of balance.

It is to be understood that I do not limit my invention to the manner of attaching weights to the pea, and in fact the pea may be omitted and the weights adapted to engage directly with the beam, making them substantially in the form of a pea.

Having thus described my invention, I claim as new and desire to secure by Letters Patent—

1. A computing-scale, comprising a scale-beam having two sets of graduations thereon, the graduation of each set indicating a unit of cost at any price and one set indicating double the amount indicated by the other set, and a weight slidable on the beam and indicating two prices per pound one price being double that of the other, substantially as described.

2. A computing-scale, comprising a scale-beam having a series of graduations thereon, each of the graduations indicating a unit of price, and a series of weights each indicating a price per unit and each adapted to be mounted on the said beam, substantially as described.

3. A computing-scale, comprising a scale-beam having two sets of graduations thereon, each graduation of each set indicating a unit of price, the graduations of one set bearing a definite relation to the graduations of the other set, and a weight indicating two prices per unit and slidably mounted on the beam, the said prices per unit bearing the above-mentioned definite relation to each other, substantially as described.

4. In a scale, a base, a supporting-arm mounted thereon and having at one end upwardly-extending diverging arms, a scale-beam having fulcrum-bearings in said diverging portions, the said beam being graduated into units of commodity value, a pea slidably mounted on the beam and having an upwardly-extending pin, and a weight bearing a price-mark and having a recess whereby the weight may be engaged over the pin on the pea and prevented from slipping off laterally, substantially as specified.

BENJAMIN F. BROUGH.

Witnesses:
S. M. SHIPP,
JAS. H. ALVEY.